(12) United States Patent
Ramabhadran et al.

(10) Patent No.: US 9,526,136 B1
(45) Date of Patent: Dec. 20, 2016

(54) ELECTRONIC DRIVER FOR AN ILLUMINATION DEVICE AND METHOD OF OPERATING THEREOF

(71) Applicant: General Electric Company, Schenectady, NY (US)

(72) Inventors: Ramanujam Ramabhadran, Niskayuna, NY (US); Danijel Maricic, Niskayuna, NY (US); Michael James Hartman, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 14/949,980

(22) Filed: Nov. 24, 2015

(51) Int. Cl.
| | | |
|---|---|---|
| *H04B 10/00* | (2013.01) | |
| *H05B 37/02* | (2006.01) | |
| *H05B 33/08* | (2006.01) | |
| *H04B 10/116* | (2013.01) | |
| *H04B 10/114* | (2013.01) | |

(52) U.S. Cl.
CPC ......... *H05B 33/0815* (2013.01); *H04B 10/116* (2013.01); *H04B 10/1149* (2013.01); *H05B 33/0845* (2013.01); *H05B 37/02* (2013.01)

(58) Field of Classification Search
CPC ......... H05B 37/02; H05B 39/00; H05B 41/00; H05B 10/116; H05B 33/0815; H05B 33/0845; H05B 37/022; H05B 33/003; H05B 33/815; H05B 37/018; H04B 10/116; H01L 25/16; Y02B 20/48
See application file for complete search history.

(56) References Cited

U.S. PATENT DOCUMENTS

| | | |
|---|---|---|
| 7,912,377 B2 | 3/2011 | Koga |
| 8,107,825 B2 | 1/2012 | Rajagopal et al. |
| 8,380,081 B2 | 2/2013 | Kim et al. |
| 8,457,502 B2 | 6/2013 | Ryan et al. |
| 8,750,719 B2 | 6/2014 | Yamada et al. |
| 2010/0247112 A1 | 9/2010 | Chang et al. |
| 2011/0063510 A1* | 3/2011 | Lee .................. G02F 1/133605 348/563 |
| 2013/0236183 A1 | 9/2013 | Chao et al. |
| 2015/0102733 A1* | 4/2015 | Knapp .............. H04L 12/40045 315/152 |
| 2015/0263808 A1* | 9/2015 | Kondo ................ H04B 10/116 398/115 |
| 2016/0099773 A1* | 4/2016 | Raj .................... H05B 33/0815 398/118 |

* cited by examiner

*Primary Examiner* — Vibol Tan
(74) *Attorney, Agent, or Firm* — Mary Louise Stanford

(57) ABSTRACT

An electronic driver is provided. The electronic driver includes a power converter including an output terminal and configured to generate a converter output power based on a first switching frequency of the power converter. The electronic driver also includes a first controller operatively coupled to the power converter and configured to control the first switching frequency of the power converter. The electronic driver further includes a visible light communication adapter operatively coupled to the output terminal of the power converter and configured to alter the converter output power to perform visible light communication.

18 Claims, 4 Drawing Sheets

ELECTRONIC DRIVER FOR AN ILLUMINATION DEVICE AND METHOD OF OPERATING THEREOF

BACKGROUND

Embodiments of the present invention relate to electronic drivers, and more particularly to an electronic driver having a visual light communication adapter.

Electronic drivers are often used to operate illumination devices. The electronic drivers are operatively coupled to the illumination device and configured to control an output power of the illumination device. By way of example, electronic drivers are used to dim the illumination device to perform visual light communication and the like.

The electronic driver is operatively coupled to a dimming controller that controls the dimming of the illumination device. However, extensive modifications are required in the electronic driver to perform the visual light communication. Such modifications to the electronic driver are expensive and complex.

Further, a switching frequency of the electronic driver is frequently altered over a wide range to perform the visual light communication. Such frequent alterations in the switching frequency over a wide range of switching frequencies lead to power losses and reduced life span of the electronic driver.

Furthermore, the electronic drivers are configured to operate at a higher output power compared to the power rating of the illumination device to maintain a constant output power at the illumination device while performing the visual light communication. Such conditions of operating the electronic driver at higher output power lead to power losses and reduced life span of the electronic drivers.

BRIEF DESCRIPTION

Briefly, in accordance with one embodiment, an electronic driver is provided. The electronic driver includes a power converter including an output terminal and configured to generate a converter output power based on a first switching frequency of the power converter. The electronic driver also includes a first controller operatively coupled to the power converter and configured to control the first switching frequency of the power converter. The electronic driver further includes a visible light communication adapter operatively coupled to the output terminal of the power converter and configured to alter the converter output power to perform visible light communication.

In another embodiment, a lighting system is provided. The lighting system includes an electronic driver and an illumination device. The electronic driver includes a power converter, a first controller, and a visible light communication adapter. The power converter includes an output terminal and is configured to generate a converter output power based on a switching frequency of the power converter. The first controller is operatively coupled to the power converter and is configured to control the switching frequency of the power converter. The visible light communication adapter is operatively coupled to the output terminal of the power converter and is configured to alter the converter output power to perform visible light communication. The illumination device is operatively coupled to the visible light communication adapter, where the visible light communication adapter is configured to perform the visible light communication, using the illumination device.

In yet another embodiment, a method for performing visible light communication is provided. The method includes detecting a presence of a visible light communication adapter in an electronic driver. The method also includes adjusting a switching frequency of a power converter in the electronic driver based on the detected visible light communication adapter. The method further includes generating a converter output power based on the switching frequency, using the power converter. The method also includes altering the converter output power, using the visible light communication adapter, to perform visible light communication using an illumination device.

In another embodiment, a retrofit visible light communication adapter is provided. The retrofit visible light communication adapter includes a positive rail and a negative rail, an output adapter terminal, an adapter controller, an adapter capacitor, an adapter inductor, an adapter switch, and an electrical adapter component. The adapter capacitor includes a first capacitor end and a second capacitor end. The first capacitor end is operatively coupled to the positive rail and the second capacitor end is operatively coupled to a common adapter node. The adapter inductor includes a first inductor end and a second inductor end. The first inductor end is operatively coupled to the common adapter node and the second inductor end is representative of a negative adapter node of the output adapter terminal. Furthermore, the adapter switch is operatively coupled to the adapter controller. The adapter switch includes a first switch end and a second switch end. The first switch end is operatively coupled to the common adapter node and the second switch end is operatively coupled to the negative rail. The electrical adapter component includes a first component end and a second component end. The first component end is operatively coupled to the positive rail and the second component end is operatively coupled to the common adapter node.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Embodiments of the present invention disclose a lighting system including a visible light communication adapter and a method for performing visible light communication using the lighting system. The lighting system includes an electronic driver and an illumination device. The electronic driver includes a power converter, a first controller, and a visible light communication adapter. The power converter includes an output terminal and configured to generate a converter output power based on a switching frequency of the power converter. The first controller is operatively coupled to the power converter and configured to control the switching frequency of the power converter. The visible light communication adapter is operatively coupled to the output terminal of the power converter and configured to alter the converter output power to perform visible light communication. The illumination device is operatively coupled to the visible light communication adapter, where the visible light communication adapter is configured to perform the visible light communication, using the illumination device.

Figure 1:
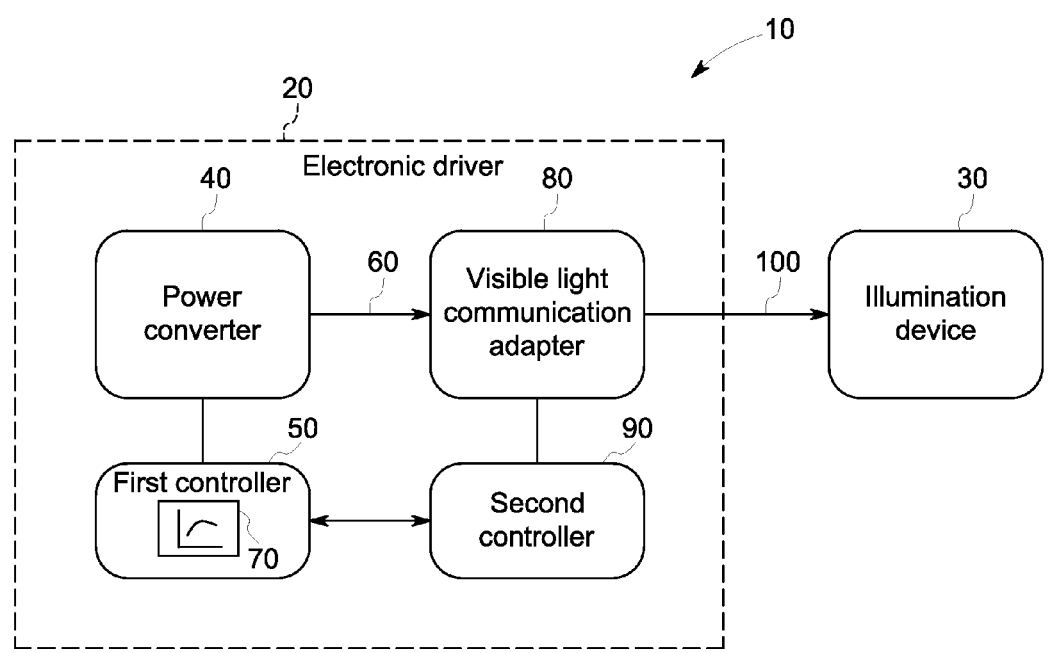
FIG. 1 is a block diagram representation of a lighting system configured to perform visible light communication in accordance with one aspect of the present invention.

FIG. 1 is a block diagram representation of a lighting system 10 configured to perform visible light communication in accordance with one aspect of the present invention. The lighting system 10 includes an electronic driver 20 and an illumination device 30. In one embodiment, the illumination device 30 includes a light emitting diode or a string of light emitting diodes. The electronic driver 20 includes a power converter 40 and a first controller 50 operatively coupled to the power converter 40. The first controller 50 is configured to control a first switching frequency of the power converter 40 to generate a converter output power which is provided to the illumination device 30. The first controller 50 is configured to control the first switching frequency of the power converter 40 based on a predetermined dimming curve 70 to perform pulse width modulation dimming of the illumination device 30. The predetermined dimming curve 70 may be stored in the first controller 50 or may be obtained by the first controller 50 from a remote location through a communication channel.

The electronic driver 20 also includes a visible light communication adapter 80. In one embodiment, the visible light communication adapter 80 may be retrofitted with the power converter 40 in the electronic driver 20. The visible light communication adapter 80 may be operatively coupled to the power converter 40, using a conducting medium. In a specific embodiment, the conducting medium may include a wire. A second controller 90 is operatively coupled to the visible light communication adapter 80. The second controller 90 is configured to control a second switching frequency of the visible light communication adapter 80. In a specific embodiment, the second switching frequency is different from the first switching frequency. In one embodiment, the second switching frequency may vary in time. In another embodiment, the second switching frequency may be constant and a duty cycle modulation may be performed to perform the visible light communication. Furthermore, the second controller 90 is communicatively coupled to the first controller 50. In some embodiments, the second controller 90 may be integrated with the first controller 50 such that the first controller is able to control the first switching frequency of the power converter 40 and control the second switching frequency or duty cycle to perform visible light communication.

In some embodiments, the first controller 50 is configured to detect a presence of the visible light communication adapter 80 and adjust the predetermined dimming curve 70 to perform the visible light communication, using the visible light communication adapter 80. The first controller 50 is configured to control the first switching frequency of the power converter 40 based on an adjusted dimming curve to generate an adjusted converter output power 60 which is fed to the visible light communication adapter 80. The visible light communication adapter 80 is configured to receive the adjusted converter output power 60 and alter the adjusted converter output power 60 based on the second switching frequency to generate an output power 100. The second controller 90 is configured to control the visible light communication adapter 80 based on the second switching frequency such that the adjusted converter output power 60 is altered by the visible light communication adapter 80 at a predetermined duty cycle. In one embodiment, the predetermined duty cycle may be in a range of seventy percent duty cycle to ninety five percent duty cycle. The output power 100 is transmitted to the illumination device 30 from the visible light communication adapter 80 to perform the visible light communication. The output power 100 allows the illumination device 30 to switch at a device frequency which is invisible to the naked eye but allows communication between the illumination device 30 and any other compatible device (not shown), system or apparatus. In one embodiment, the communication between the illumination device 30 and any other device may also include data transfer.

Figure 2:
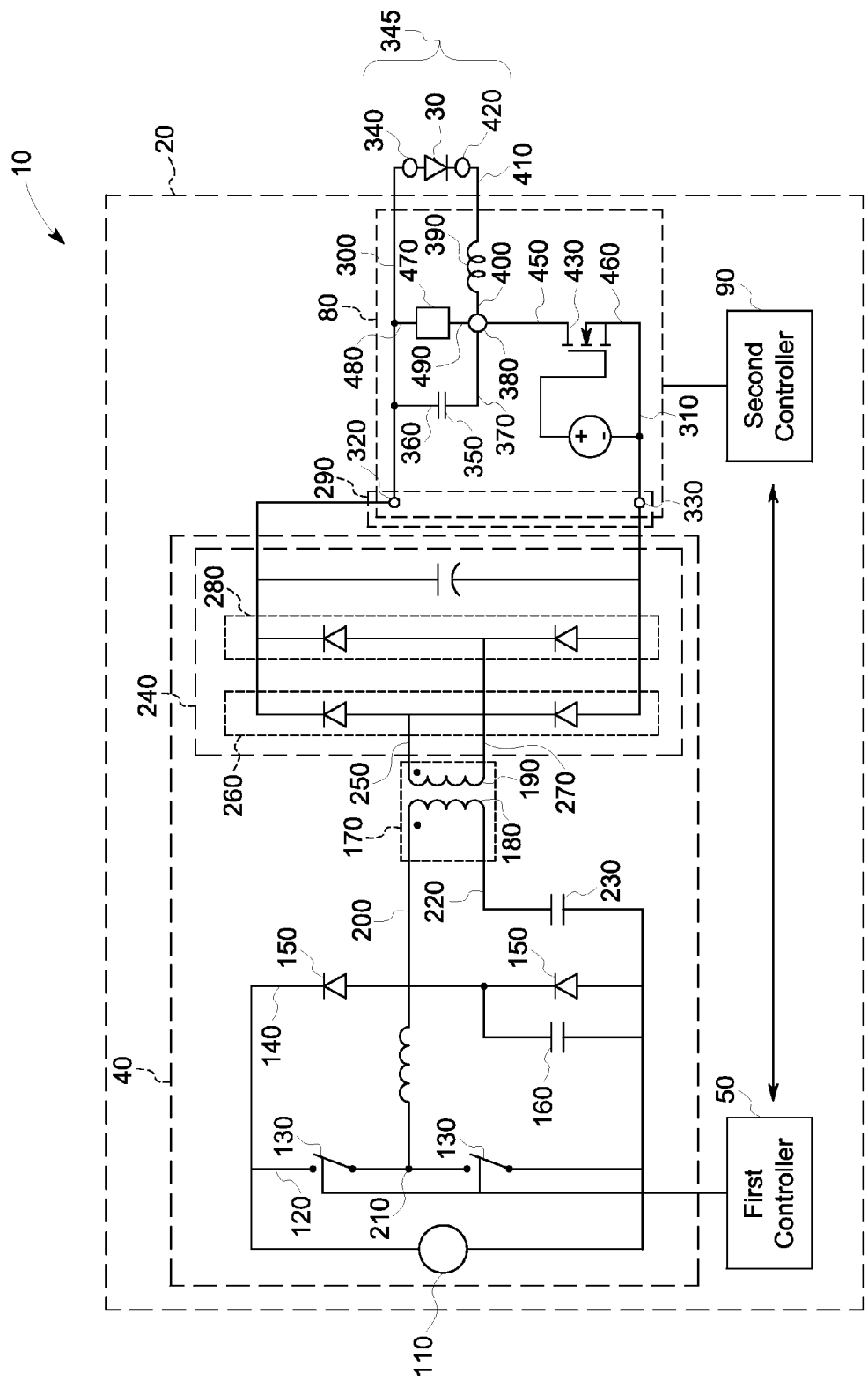
FIG. 2 is a schematic representation of the lighting system of FIG. 1 including the visible light communication adapter according to one embodiment of the present invention.

FIG. 2 is a schematic representation of the lighting system 10 of FIG. 1 including the visible light communication adapter 80 according to one embodiment of the present invention. The electronic driver 20 is operatively coupled to a power source 110 which provides input power to the electronic driver 20. In one embodiment, the power converter 40 of the electronic driver 20 includes a voltage source based power converter. The power converter 40 is configured to receive the input power from the power source 110 and convert the input power to the adjusted converter output power 60 based on the first switching frequency.

The power converter 40 includes a first string 120 having a plurality of switches 130 operatively coupled to each other in a series configuration. The first controller 50 is operatively coupled to the plurality of switches 130 and configured to control the plurality of switches 130 based on the first switching frequency to convert the input power to an intermediate converter power. The power converter 40 further includes a second string 140 including a plurality of diodes 150 operatively coupled to each other in a series configuration. In one embodiment, the first string 120 and the second string 140 are operatively coupled to each other in a parallel configuration. The power converter 40 also includes a first capacitive element 160 operatively coupled to the second string 140 in a parallel configuration. The power converter 40 further includes a transformer 170 having a primary winding 180 and a secondary winding 190. The primary winding 180 includes a first end 200 operatively coupled to the first string 120 at a first node 210 and a second end 220 operatively coupled to a second capacitive element 230. The secondary winding 190 is operatively coupled to a rectifier 240 in the power converter 40. A first end 250 of the secondary winding 190 is operatively coupled to a first leg 260 of the rectifier 240 and a second end 270 of the secondary winding 190 is operatively coupled to a second leg 280 of the rectifier 240.

During operation, the plurality of switches 130 and the plurality of diodes 150 convert the input power to a plurality of current pulses. The plurality of current pulses flow through the primary winding 180 of the transformer 170 to the second capacitive element 230. The flow of the plurality of current pulses through the primary winding 180 induces a plurality of corresponding current pulses in the secondary winding 190. The corresponding current pulses flowing through the secondary winding 190, are then transmitted to the rectifier 240 which converts the corresponding current pulses to the converter output power. The converter output power is transmitted to an output terminal 290 of the power converter 40.

The visible light communication adapter 80 is operatively coupled to the output terminal 290 of the power converter 40. The visible light communication adapter 80 is configured to receive the converter output power 60. The visible light communication adapter 80 is configured to alter the converter output power 60 to generate the output power 100 (FIG. 1) to perform the visible light communication, using the illumination device 30.

The visible light communication adapter 80 includes a positive rail 300 and a negative rail 310. The positive rail 300 is operatively coupled to a positive node 320 of the output terminal 290 of the power converter 40. The negative rail 310 is operatively coupled to a negative node 330 of the output terminal 290 of the power converter 40. The positive rail 300 includes a positive adapter node 340 of an output adapter terminal 345 of the visible light communication adapter 80. The visible light communication adapter 80 further includes an adapter capacitor 350 having a first capacitor end 360 and a second capacitor end 370. The first capacitor end 360 is operatively coupled to the positive rail 300 and the second capacitor end 370 is operatively coupled to a common adapter node 380 in the visible light communication adapter 80. The visible light communication adapter 80 further includes an adapter inductor 390 having a first inductor end 400 and a second inductor end 410. The first inductor end 400 is operatively coupled to the common adapter node 380. The second inductor end 410 includes a negative adapter node 420 of the output adapter terminal 345 of the visible light communication adapter 80. Furthermore, the visible light communication adapter 80 includes an adapter switch 430 operatively coupled to the second controller 90 (also referred to as an "adapter controller"). The adapter switch 430 includes a first switch end 450 and a second switch end 460. The first switch end 450 is operatively coupled to the common adapter node 380 and the second switch end 460 is operatively coupled to the negative rail 310.

Further, the visible light communication adapter 80 includes an electrical adapter component 470 having a first component end 480 and a second component end 490. The first component end 480 is operatively coupled to the positive rail 300 and the second component end 490 is operatively coupled to the common adapter node 380. Furthermore, the output adapter terminal 345 is operatively coupled to the illumination device 30. The visible light communication adapter 80 is configured to transmit the output power 100 to the illumination device 30 for performing the visible light communication.

Figure 3:
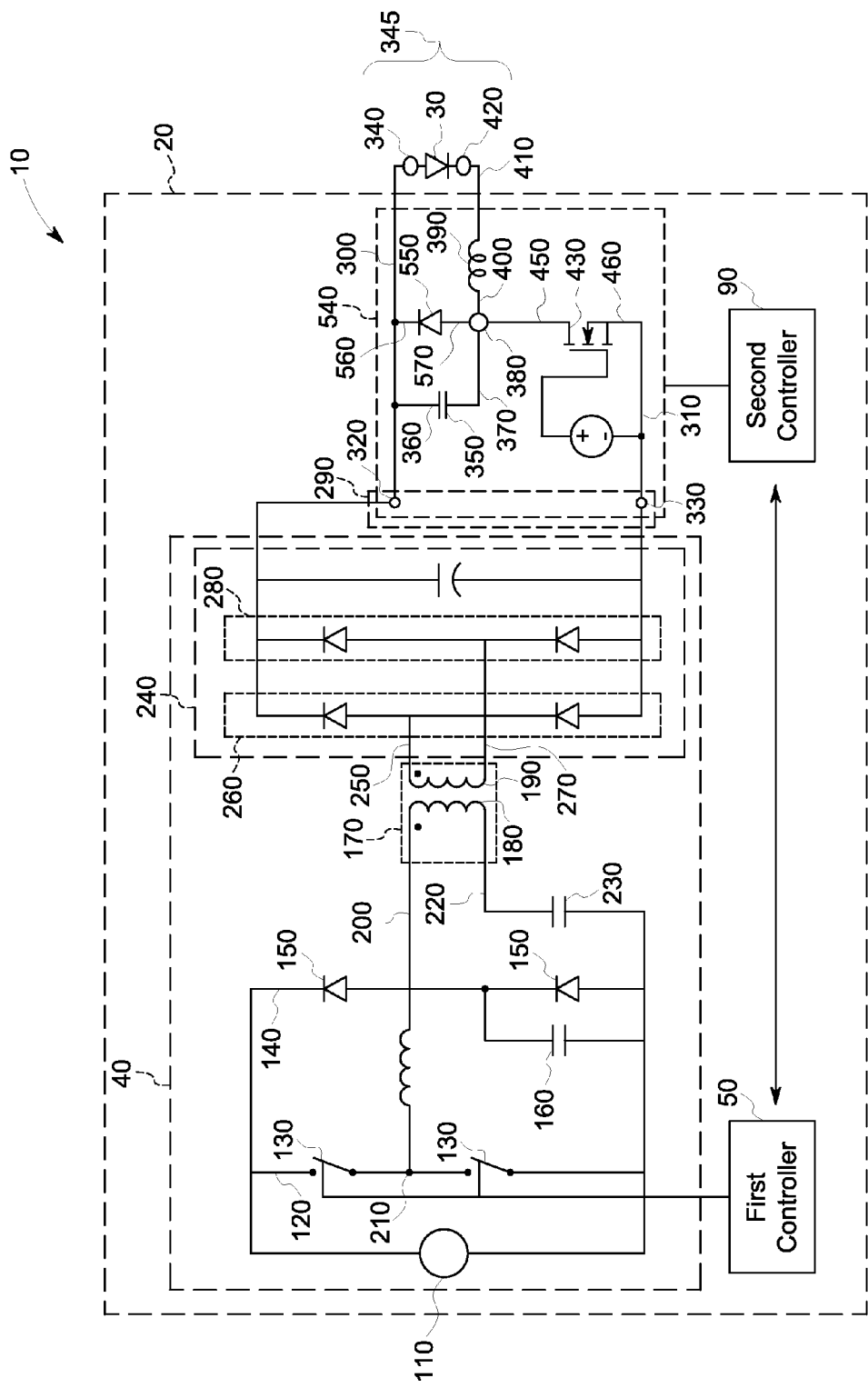
FIG. 3 is a schematic representation of another embodiment of a lighting system of FIG. 2.

FIG. 3 is a schematic representation of a lighting system 10 according to another embodiment of the present invention. The lighting system 10 includes the electronic driver 20 and an illumination device 30. The electronic driver 20 includes a voltage source based power converter 40. The voltage source based power converter 40 is operatively coupled to a visible light communication adapter 80. In the illustrated embodiment, the visible light communication adapter 80 includes an adapter diode 550, instead of the electrical adapter component 470 shown in FIG. 2. The adapter diode 550 includes a first diode end 560 and a second diode end 570. The first diode end 560 is operatively coupled to the positive rail 300 of the visible light communication adapter 540 and the second diode end 570 is operatively coupled to the common adapter node 380. Similarly, the electrical adapter component 470 may be replaced by an additional inductor for a current source based power converter.

Figure 4:
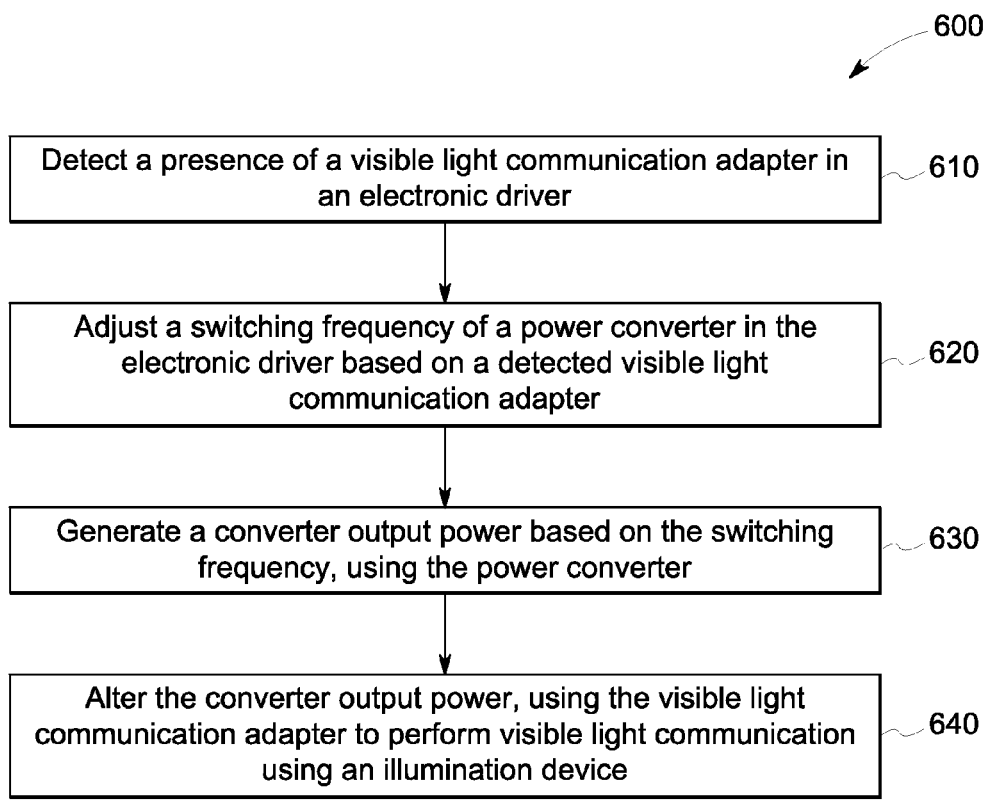
FIG. 4 is a flow chart representing steps involved in a method for performing visible light communication using an illumination device according to one embodiment of the present invention.

FIG. 4 is a flow chart representing steps involved in a method 600 for performing visible light communication using an illumination device, according to one embodiment of the present invention. The method 600 includes detecting a presence of a visible light communication adapter in an electronic driver in step 610. The method 600 also includes adjusting a switching frequency of a power converter in the electronic driver based on the detected visible light communication adapter in step 620. The method 600 further includes generating a converter output power based on the switching frequency, using the power converter in step 630. The method 600 also includes altering the converter output power, using the visible light communication adapter, to perform visible light communication 640.

It is to be understood that a skilled artisan will recognize the interchangeability of various features from different embodiments and that the various features described, as well as other known equivalents for each feature, may be mixed and matched by one of ordinary skill in this art to construct additional systems and techniques in accordance with principles of this specification. It is, therefore, to be understood that the appended claims are intended to cover all such modifications and changes as fall within the true spirit of the invention.

Embodiments of the present invention provide a visible light communication adapter that may be operatively coupled to the power converter of an electronic driver used for operating an illumination device. The visible light communication adapter may be retrofitted to an existing electronic driver without modifications to the existing electronic driver. Moreover, the visible light communication adapter may also be operatively coupled to the power converters in existing electronic drivers with minimal modifications. Further, a life span of the power converter can be increased, since the power converter does not need to operate at higher output levels.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An electronic driver comprising:
   a power converter comprising an output terminal and configured to generate a converter output power based on a first switching frequency of the power converter;
   a first controller operatively coupled to the power converter and configured to control the first switching frequency of the power converter; and
   a visible light communication adapter operatively coupled to the output terminal of the power converter and configured to alter the converter output power to perform visible light communication;
   wherein the power converter comprises:
   a first string comprising a plurality of switches operatively coupled to each other in a series configuration;
   a second string comprising a plurality of diodes operatively coupled to each other in a series configuration;
   a transformer comprising a primary winding and a secondary winding, wherein the primary winding comprises a first end operatively coupled to the first string at a first node;
   a rectifier comprising a first leg operatively coupled to a first end of the secondary winding and a second leg operatively coupled to a second end of the secondary winding;

a first capacitive element operatively coupled to the second string in a parallel configuration; and a second capacitive element operatively coupled to a second end of the primary winding.

2. The electronic driver of claim 1, further comprising a second controller operatively coupled to the visible light communication adapter and configured to control a second switching frequency of the visible light communication adapter.

3. The electronic driver of claim 2, wherein the second controller is communicatively coupled to the first controller.

4. The electronic driver of claim 2, wherein the second switching frequency is different from the first switching frequency.

5. The electronic driver of claim 1, wherein the visible light communication adapter comprises:

an adapter capacitor operatively coupled to a positive node of the output terminal of the power converter;

an adapter inductor operatively coupled to the adapter capacitor in a series configuration; and an adapter switch comprising a first switch end operatively coupled to a common adapter node of the output terminal of the power converter and a second switch end operatively coupled between the adapter capacitor and the adapter inductor at the common adapter node.

6. The electronic driver of claim 5, further comprising an electrical adapter component comprising a first component end operatively coupled to the positive node of the output terminal and a second component end operatively coupled to the common adapter node.

7. The electronic driver of claim 6, wherein the electrical adapter component comprises an adapter diode for a voltage source based power converter.

8. The electronic driver of claim 1, wherein the visible light communication adapter is configured to perform the visible light communication, using an illumination device.

9. The electronic driver of claim 1, wherein the first controller is configured to perform pulse width modulation dimming of an illumination device simultaneously with the visible light communication.

10. A lighting system comprising:
an electronic driver comprising:
a power converter comprising an output terminal and configured to generate a converter output power based on a switching frequency of the power converter;
a first controller operatively coupled to the power converter and configured to control the switching frequency of the power converter; and
a visible light communication adapter operatively coupled to the output terminal of the power converter and configured to alter the converter output power to perform visible light communication; and
an illumination device operatively coupled to the visible light communication adapter, wherein the visible light communication adapter is further configured to perform the visible light communication, using the illumination device;
wherein the electronic driver further comprises a second controller operatively coupled to the visible light communication adapter and communicatively coupled to the first controller.

11. The lighting system of claim 10, wherein the electronic driver is further configured to perform a pulse width modulation dimming of the illumination device simultaneously with the visible light communication, using the illumination device.

12. The lighting system of claim 10, wherein the illumination device comprises a light emitting diode.

13. A retrofit visible light communication adapter comprising:

a positive rail and a negative rail;

an output adapter terminal;

an adapter controller;

an adapter capacitor comprising a first capacitor end and a second capacitor end, wherein the first capacitor end is operatively coupled to the positive rail and the second capacitor end is operatively coupled to a common adapter node;

an adapter inductor comprising a first inductor end and a second inductor end, wherein the first inductor end is operatively coupled to the common adapter node and the second inductor end is representative of a negative adapter node of the output adapter terminal;

an adapter switch operatively coupled to the adapter controller, wherein the adapter switch comprises a first switch end and a second switch end, wherein the first switch end is operatively coupled to the common adapter node and the second switch end is operatively coupled to the negative rail; and an electrical adapter component comprising a first component end and a second component end, wherein the first component end is operatively coupled to the positive rail and the second component end is operatively coupled to the common adapter node.

14. The retrofit visible light communication adapter of claim 13, wherein the electrical adapter component further comprises an adapter diode.

15. The retrofit visible light communication adapter of claim 13, wherein the positive rail is configured to be operatively coupled to a positive node of an output terminal of a power converter and the negative rail of is configured to be operatively coupled to a negative node of the output terminal of the power converter, and wherein the output adapter terminal is configured to be operatively coupled to an illumination device.

16. A method comprising:
detecting presence of a visible light communication adapter in an electronic driver;
adjusting a switching frequency of a power converter in the electronic driver based on the detected visible light communication adapter;
generating a converter output power based on the switching frequency, using the power converter; and
altering the converter output power, using the visible light communication adapter, to perform visible light communication using an illumination device;
wherein the power converter comprises:
a first string comprising a plurality of switches operatively coupled to each other in a series configuration;
a second string comprising a plurality of diodes operatively coupled to each other in a series configuration;
a transformer comprising a primary winding and a secondary winding, wherein the primary winding comprises a first end operatively coupled to the first string at a first node;
a rectifier comprising a first leg operatively coupled to a first end of the secondary winding and a second leg operatively coupled to a second end of the secondary winding;
a first capacitive element operatively coupled to the second string in a parallel configuration; and
a second capacitive element operatively coupled to a second end of the primary winding.

17. A method according to claim 16, wherein the visible light communication adapter comprises:
- an adapter capacitor operatively coupled to a positive node of the output terminal of the power converter;
- an adapter inductor operatively coupled to the adapter capacitor in a series configuration; and
- an adapter switch comprising a first switch end operatively coupled to a common adapter node of the output terminal of the power converter and a second switch end operatively coupled between the adapter capacitor and the adapter inductor at the common adapter node.

18. An electronic driver comprising:
- a power converter comprising an output terminal and configured to generate a converter output power based on a first switching frequency of the power converter;
- a first controller operatively coupled to the power converter and configured to control the first switching frequency of the power converter; and
- a visible light communication adapter operatively coupled to the output terminal of the power converter and configured to alter the converter output power to perform visible light communication;

wherein
the power converter comprises:
- a first string comprising a plurality of switches operatively coupled to each other in a series configuration;
- a second string comprising a plurality of diodes operatively coupled to each other in a series configuration;
- a transformer comprising a primary winding and a secondary winding, wherein the primary winding comprises a first end operatively coupled to the first string at a first node;
- a rectifier comprising a first leg operatively coupled to a first end of the secondary winding and a second leg operatively coupled to a second end of the secondary winding;
- a first capacitive element operatively coupled to the second string in a parallel configuration; and
- a second capacitive element operatively coupled to a second end of the primary winding; and the visible light communication adapter comprises:
- an adapter capacitor operatively coupled to a positive node of the output terminal of the power converter;
- an adapter inductor operatively coupled to the adapter capacitor in a series configuration; and
- an adapter switch comprising a first switch end operatively coupled to a common adapter node of the output terminal of the power converter and a second switch end operatively coupled between the adapter capacitor and the adapter inductor at the common adapter node.

* * * * *